A. E. SCHUETTE.
DRIVING MECHANISM.
APPLICATION FILED OCT. 7, 1920.
1,407,890.
Patented Feb. 28, 1922.
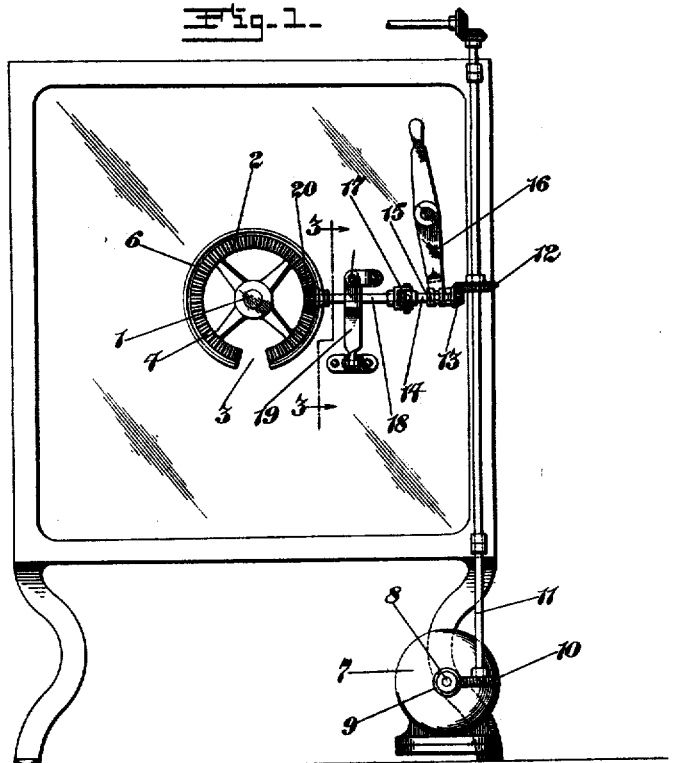
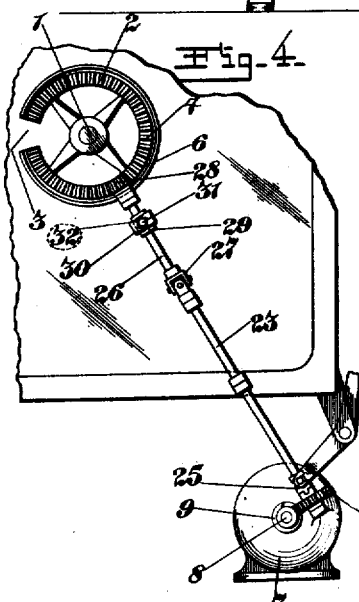
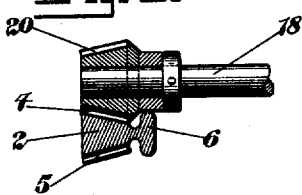
INVENTOR.
AUGUST E. SCHUETTE,
BY
HIS ATTORNEYS.

UNITED STATES PATENT OFFICE.

AUGUST E. SCHUETTE, OF RED BUD, ILLINOIS.

DRIVING-MECHANISM.

1,407,890. Specification of Letters Patent. Patented Feb. 28, 1922.

Application filed October 7, 1920. Serial No. 415,417.

*To all whom it may concern:*

Be it known that I, AUGUST E. SCHUETTE, a citizen of the United States, residing at Red Bud, Randolph County, Illinois, have invented new and useful Improvements in Driving Mechanism, of which the following is a specification.

This invention relates to driving mechanisms, and has special reference to driving mechanisms adapted for the operation of domestic washing machines, although it will be understood that the invention is not restricted to that use.

An object of the invention is to provide a power driven mechanism for operating the washing machines or the like which employs a minimum number of parts essential to obtain the best results, which is exceedingly simple in its construction and mode of operation; which is strong and durable and which is practically noiseless in operation.

With the foregoing and other objects in view, my invention may take form in different embodiments and variations, only two of which I have shown in the drawings, in which Fig. 1 is an elevation of a washing machine having one form of the invention in connection therewith.

Fig. 2 is a sectional view showing the gearing by which the washing machine mechanism may be driven alternately in opposite directions.

Fig. 3 is a detailed view from the line 3—3 of Fig. 1, showing a form of support which may be employed to support one of the shafts.

Fig. 4 is a view showing a different arrangement of the shafting for driving the washing machine mechanism alternately in opposite directions.

Although I have shown only two variations or modifications of the invention, it is obvious that the invention may take other forms and I do not restrict my invention to the specific forms shown, or to any specific forms. My invention is as broad as the scope of the appended claims.

In the form of the invention shown in Fig. 1, the shaft 1 of the washing machine mechanism supports a wheel 2 having an opening 3 at one side of the shaft 1 to permit the gear by which the wheel 2 is driven to move from one side to the other of said wheel 2 in order to drive said wheel 2 alternately in opposite directions. The wheel 2 is provided with an arcuate or circular series of teeth 4 on its outer face and with a similar series of teeth 5 on its inner face. If desired, the wheel 2 may be and as shown said wheel is provided with a circumferential portion 6 serving as a track or support for the entrained driving device for the purpose, among others, of preventing locking of the parts by too close engagement.

As shown, there is a motor 7 arranged to drive a shaft 8 equipped with a worm or gear 9. The worm or gear 9 meshes with and drives a worm or gear 10 which is attached to a shaft 11 having a gear 12 thereon. The gear 12 meshes with and drives a gear 13 which, in the form shown, is loosely supported upon a shaft 14. The gear 13 may be locked upon a shaft 14 by means of a clutch member 15 movable on the shaft into and out of engagement with the gear 13 by a lever 16. A universal joint 17 of any known or appropriate construction unites the shaft 14 with a shaft 18 so that the shaft 18 is driven by the shaft 14. The shaft 18 is supported in a swinging support 19 which is capable of sufficient movement to move the gear 20 on said shaft 18 from one side to the other of the wheel 2, as required to mesh the gear 20 alternately with the teeth 4 and 5. The gear 20 moves from one side to the other of the wheel 2 through the opening 3 so as to drive the wheel 2 alternately in opposite directions. As shown, the track 6 constitutes a support for the hub of the wheel 20, thus preventing locking engagement of the wheel 20 with the teeth of the wheel 2.

Lateral movement of the pivoted support 19 is limited by stops 21 (Fig. 3) which, as shown, may be adjustable so that the lateral movement of said support may be accurately controlled. Springs 22 may be employed to impart initial movement to the support 19 when the opening 3 is opposite the wheel 20 and in position to permit movement of the wheel 20 from one side to the other of the wheel 2. Said springs 22 also serve to cushion and soften the force of the movement of the support 19 so that the operation of the machine is rendered practically noiseless.

In the modification or variation of the invention shown in Fig. 4, the shaft having the universal joint therein for driving the wheel 2 is driven from the gearing of the shaft 8. As shown in Fig. 4 a shaft 23 loosely supports a gear or worm 24, the same being under control of a clutch 25, whereby the shaft 23 may be driven from the shaft 8 or not, as desired. The gear or worm 24 is in mesh with the gear or worm 9. A shaft 26 is connected up with the shaft 23 by a universal joint 27. The equipment of the shaft 26 is the same as the equipment of the shaft 18, there being a gear 28 on said shaft 26 corresponding to the gear 20 on the shaft 18.

The shaft 26 is supported for lateral movement by a sliding bearing 29 mounted in a guide 30, lateral movement of said bearing being limited by adjustable stops 31 similar to the stops 21. Springs 32 may be employed to soften and to silence the force of the movement of the shaft 26 and to impart initial movements thereto when it is time for said shaft to move from one position to another.

From the foregoing it is apparent that my invention serves all of its intended objects in a highly satisfactory manner. As stated the invention may take different forms. It is silent and durable in operation and may be used advantageously by unskilled persons.

I do not restrict myself to unessential limitations, but what I claim and desire to secure by Letters Patent, is:—

1. The combination with a gear to be rotated alternately in opposite directions, a rotary shaft, an additional shaft pivoted to said rotary shaft and driven thereby, a gear in connection with said additional shaft meshing with the first-named gear, a swinging support for said additional shaft for swinging said gear on said shaft to opposite sides of the first-named gear, springs for imparting initial movement to said support when said support is to be moved, and stops for said support.

2. In gearing of the character described, the combination of a rotary shaft, an additional shaft pivoted to and driven by the rotary shaft, a pivoted support supporting the additional shaft and arranged to swing to different positions, and springs for receiving the impact of said support when said support is moved, and for imparting initial movement thereto when said support is to be moved.

3. In gearing of the character described, the combination of a rotary shaft, an additional shaft pivoted to and driven by the rotary shaft, a pivoted support supporting the additional shaft and arranged to swing to different positions, springs for receiving the impact of said support when said support is moved, and for imparting initial movement thereto when said support is to be moved, and abutments cooperating with said springs to stop swinging movements of said support.

4. A gearing of the character described, comprising a rotary shaft, an additional shaft pivoted to and driven by the rotary shaft, a pivoted support in which the additional shaft is journaled for rotation, adjustable stops for limiting swinging movement of said support, and springs for imparting initial movement to said support when said support is to be moved.

AUGUST E. SCHUETTE.